United States Patent
Arakane et al.

(10) Patent No.: US 7,230,567 B2
(45) Date of Patent: Jun. 12, 2007

(54) AZIMUTH/ATTITUDE DETECTING SENSOR

(75) Inventors: Hiroomi Arakane, Tokyo (JP);
Nobuyuki Okamura, Tokyo (JP);
Takao Sagawa, Tokyo (JP)

(73) Assignee: Tokimec Inc., Ota-ku, Tokyo (JP)

( * ) Notice: Subject to any disclaimer, the term of this patent is extended or adjusted under 35 U.S.C. 154(b) by 0 days.

(21) Appl. No.: 11/259,279

(22) Filed: Oct. 27, 2005

(65) Prior Publication Data

US 2006/0038718 A1 Feb. 23, 2006

(30) Foreign Application Priority Data

Jan. 11, 2004 (JP) ............................. 2004-318439

(51) Int. Cl.
*G01S 5/14* (2006.01)

(52) U.S. Cl. ........................... 342/357.11; 342/357.14; 701/216

(58) Field of Classification Search ........... 342/357.11, 342/357.14; 701/216
See application file for complete search history.

(56) References Cited

U.S. PATENT DOCUMENTS

| | | | | |
|---|---|---|---|---|
| 3,521,838 A | * | 7/1970 | Robertson et al. | 244/191 |
| 5,617,317 A | * | 4/1997 | Ignagni | 701/215 |
| 5,890,092 A | * | 3/1999 | Kato et al. | 701/216 |
| 2004/0260468 A1 | * | 12/2004 | Bang et al. | 701/220 |
| 2005/0065728 A1 | * | 3/2005 | Yang et al. | 701/220 |
| 2005/0162382 A1 | * | 7/2005 | Choi et al. | 345/156 |

FOREIGN PATENT DOCUMENTS

| | | |
|---|---|---|
| JP | 06-201863 | 7/1994 |
| JP | 11-094573 | 4/1999 |
| JP | 3038452 | 3/2000 |
| JP | 2002-158525 | 5/2002 |

* cited by examiner

*Primary Examiner*—Thomas H. Tarcza
*Assistant Examiner*—Fred H. Mull
(74) *Attorney, Agent, or Firm*—McGinn IP Law Group, PLLC

(57) ABSTRACT

The sensor successively calculates a rolling angle, pitch angle and azimuth from the coordinate transformation matrix with the level error and azimuth error compensated. It calculates azimuth error compensatory values using the GPS direction signal and calculates a difference between the GPS direction signal and magnetic azimuth signal under a condition wherein the reliability of the GPS direction signal is high, whereas it calculates azimuth error compensatory values using the calculated difference between the GPS direction signal and magnetic azimuth signal and the magnetic azimuth signal under a condition wherein the reliability of the GPS direction signal is not high and under a condition wherein the reliability of the magnetic azimuth signal is not low.

5 Claims, 5 Drawing Sheets

AZIMUTH/ATTITUDE DETECTING SENSOR

BACKGROUND OF THE INVENTION

1. Field of the Invention

The present invention relates to an azimuth/attitude detecting sensor according to a strap-down system, which detects an azimuth/attitude of a mobile unit such as a ship or car.

2. Description of the Related Art

Conventionally, an azimuth/attitude detecting sensor according to a strap-down system includes X, Y and Z accelerometers which detect accelerations in respective axial directions and X, Y and Z gyros which detect angular velocities around respective axes (see Japanese Patent No. 3038452).

This azimuth/attitude detecting sensor uses gyro signals obtained from the gyros to calculate a matrix for transforming a coordinate system of a body to which a sensor is attached (called a "body coordinate system") to a coordinate system in which the X-axis direction corresponds to the north direction and the Z-axis direction coincides with the gravity direction (called a "local coordinate system"), calculates an azimuth, pitch angle and rolling angle which are angles of rotation around the respective axes with respect to the local coordinate system from this matrix, outputs an azimuth/attitude and corrects attitude errors caused by gyro errors through gravity acceleration detection detected by the accelerometers.

However, the accelerometers also detect motion acceleration other than gravity, and therefore a problem is that an attitude error occurs under the influence of motion acceleration. Using costly and high-performance gyros and accelerometers allow an azimuth/attitude detecting sensor less susceptible to motion acceleration to be constructed, but the influence of the motion acceleration when a low cost, low precision gyro or accelerometer is used is considerable and a problem is that they are unusable for practical applications depending on the motion state.

As a structure for eliminating such influences of motion acceleration, for example, an X velocimeter is provided to detect a velocity in the X-axis direction for correcting acceleration errors is known from Japanese Patent Laid-Open No. 6-201863.

When a mobile unit performs turning motion, the mobile unit which cannot bear a centrifugal force occured during the turning motion, produces a side slipping which causes the velocity in the traveling direction not to match the actual trajectory velocity. The side slipping produces an error of the angles of attitude because only the velocity in the X-axis direction can be detected and an acceleration component due to the velocity in the Y-axis direction cannot be compensated. Japanese Patent Laid-Open No. 6-201863 proposes to determine an angle of the side slipping from an azimuth signal and velocity signal in the X-axis direction through a calculation in order to prevent the error of the angles of attitude produced by the side slipping.

However, such a calculation described in Japanese Patent Laid-Open No. 6-201863 requires a velocimeter and also requires a calculation apparatus calculating the angle of side slipping, resulting in a problem that the size and cost of the apparatus increase.

Furthermore, with regard to azimuth compensation, it is conventionally a general practice to use an azimuth signal detected by a magnetic azimuth sensor from Japanese Patent No. 3038452 or Japanese Patent Laid-Open No. 11-94573. For example, Japanese Patent Laid-Open No. 11-94573 discloses a structure in which when a traveling azimuth detected by a gyro is compensated, an azimuth detected by a geomagnetism sensor is assumed to be a traveling azimuth and the azimuth detected by the gyro is followed to the azimuth detected by the geomagnetism sensor.

However, according to the structure in Japanese Patent Laid-Open No. 11-94573, when the magnetic azimuth sensor detects a wrong azimuth under the influence of surrounding magnetic field environment, the wrong direction is assumed to be the traveling azimuth. Moreover, since the azimuth detected by the geomagnetism sensor is unconditionally assumed to be the traveling azimuth, a problem is that in the case of a motion state in which the traveling direction differs from the axial direction of the magnetic azimuth sensor, a wrong direction may be assumed to be the traveling direction.

Taking the problem of such a geomagnetism sensor into consideration, Japanese Patent Laid-Open No. 2002-158525 proposes to use a GPS receiver.

According to Japanese Patent Laid-Open No. 2002-158525, a most reliable estimated value is selected as an absolute azimuth reference value according to a situation of the mobile unit at the present moment, an absolute azimuth detected by a magnetic compass is regarded as an absolute azimuth reference value when a certain condition is satisfied and a traveling direction azimuth detected by a GPS receiver is regarded as an absolute azimuth reference value when another condition is satisfied.

However, in Japanese Patent Laid-Open No. 2002-158525, when the reference value changes from the absolute azimuth detected by the magnetic compass to the traveling direction azimuth detected by the GPS receiver depending on change of the condition, which produces a problem that the reference value changes drastically and it lacks reliability as a reference value.

The present invention has been implemented in view of such problems and it is an object of the present invention to provide an azimuth/attitude detecting sensor capable of making highly reliable azimuth error compensations using a GPS direction detected by GPS receiver and magnetic azimuth detected using a magnetic azimuth sensor.

Furthermore, it is another object of the present invention to provide an azimuth/attitude detecting sensor when making level error compensations using acceleration detected by an accelerometer, capable of making highly reliable level error compensations in a simple structure and at low cost.

SUMMARY OF THE INVENTION

In order to solve the above described problems, an azimuth/attitude detecting sensor mounted on a mobile unit for detecting an azimuth/attitude of the mobile unit according to the invention, comprises at least three gyros that detect angular velocities around three axes, at least three accelerometers that detect acceleration in three axial directions, GPS receiver that detects a moving direction of the mobile unit using GPS, a magnetic azimuth sensor that detects the magnetic azimuth and calculation unit for receiving the angular velocity signals output from the gyros, acceleration signals output from the accelerometers, GPS direction signal output from the GPS receiver, magnetic azimuth signal output from the magnetic azimuth sensor and calculating a rolling angle, pitch angle and azimuth.

The calculation unit comprises a coordinate transformation matrix updating section that successively calculates and updates a coordinate transformation matrix from a body coordinate system to which the gyros and accelerometers are attached, into a local coordinate system using the angular velocity signals, a coordinate transformation section that performs a coordinate transformation of the acceleration signals using the coordinate transformation matrix from the coordinate transformation matrix updating section, a calculation section for level error compensatory value that calculates a level error compensatory value using the acceleration signals transformed by the coordinate transformation section, a calculation section for azimuth error compensatory value that calculates an azimuth error compensatory value using the GPS direction signal and magnetic azimuth signal, an attitude/azimuth calculation section that calculates a rolling angle, pitch angle and azimuth from the coordinate transformation matrix compensated by the level error compensatory value and azimuth error compensatory value.

The calculation section for azimuth error compensatory value calculates the azimuth error compensatory value using the GPS direction signal and calculates a difference between the GPS direction signal and magnetic azimuth signal under a condition wherein the reliability of the GPS direction signal is high whereas it calculates the azimuth error compensatory value using the calculated difference between the GPS direction signal and magnetic azimuth signal and the magnetic azimuth signal under a condition wherein the reliability of the GPS direction signal is not high and under a condition wherein the reliability of the magnetic azimuth signal is high.

According to the present invention, under a condition wherein rite reliability of the GPS direction signal is high, azimuth error is compensated by using a GPS direction signal and a difference between the GPS direction signal and a magnetic azimuth signal is calculated as well. Under a condition wherein the reliability of the GPS direction signal is not high, instead of using only the magnetic azimuth signal, an azimuth error is compensated by using the difference between the GPS direction signal and magnetic azimuth signal calculated when the reliability of the GPS direction signal was high and the magnetic azimuth signal. Therefore a signal to be referenced does not change drastically between when the reliability of the GPS direction signal is high and when the reliability of the GPS direction signal is not high. Even when there is an influence of a surrounding magnetic field environment, it is possible to reduce the influence thereof and correct azimuth errors more accurately.

The condition wherein the reliability of the GPS direction signal is high can include at least one of conditions that the velocity of the mobile unit is equal to or higher than a predetermined value, that the calculated azimuth variation is equal to or lower than a second predetermined value and that a difference between the GPS direction signal and magnetic azimuth signal is equal to or lower than a third predetermined value. Since the velocity of the mobile unit, azimuth variation or difference between the GPS direction signal and magnetic azimuth signal is used as the condition wherein the reliability of the GPS direction signal is high, it is possible to surely decide the reliability of the GPS direction signal.

The calculation section for azimuth error compensatory value can regard a value indicating a difference between the azimuth and GPS direction as the azimuth error compensatory value under a condition wherein the reliability of the GPS direction signal is high. Thus, it is possible to perform a process of allowing the azimuth to track the GPS azimuth when the reliability of the GPS direction signal is high.

The calculation section for azimuth error compensatory value can regard a value indicating a difference between the azimuth and a value obtained by subtracting a value based on the difference between the GPS direction signal and magnetic azimuth signal from the magnetic azimuth as an azimuth error compensatory value under a condition wherein the reliability of the GPS direction signal is not high and under a condition wherein the reliability of the magnetic azimuth signal is high. Thus, it is possible to perform a process of allowing the azimuth to track a value obtained by subtracting the value based on the difference between the GPS direction signal and magnetic azimuth signal from the magnetic azimuth.

The calculation section for level error compensatory value can remove the motion acceleration from the accelerations of the acceleration signals using a GPS velocity signal output from the GPS receiver and calculates the level error compensatory value. Since the GPS velocity obtained by the GPS receiver is used to remove influences of the motion acceleration for the acceleration detected by the accelerometer, it is possible to correct the level error in a simple structure and at low cost.

The present disclosure relates to subject manner contained in Japanese Patent Application No. 2004-318439, filed on Nov. 1, 2004, which is expressly incorporated herein by reference in its entirety.

DETAILED DESCRIPTION OF THE PREFERRED EMBODIMENTS

With reference now to the attached drawings, an embodiment of the present invention will be explained below.

Figure 1:
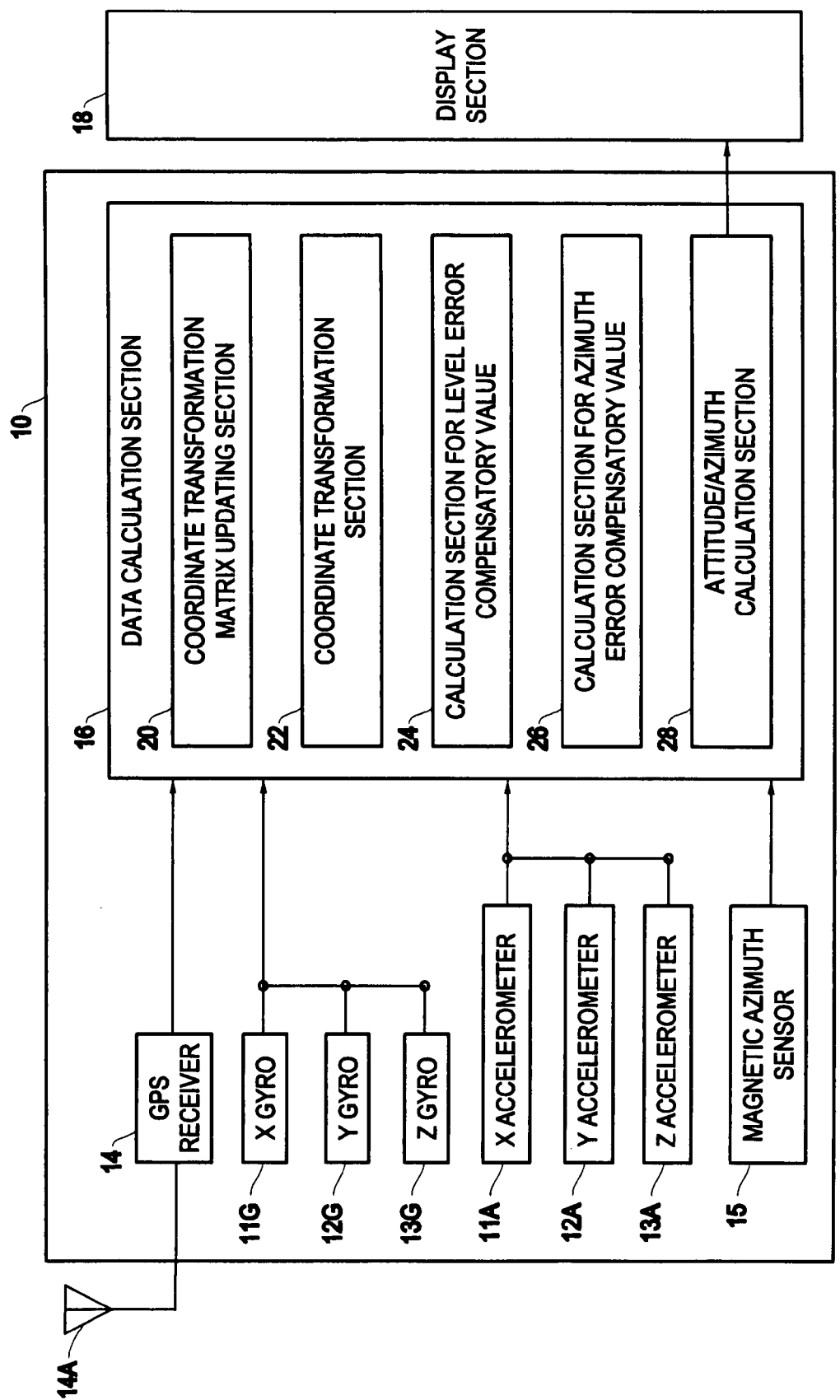
FIG. 1 is a block diagram of an azimuth/attitude detecting sensor according to an embodiment of the present invention.

FIG. 1 is a block diagram of an azimuth/attitude detecting sensor according to an embodiment of the present invention. The azimuth/attitude detecting sensor 10 is provided with an X gyro 11G which detects an angular velocity around the X-axis, a Y gyro 12G which detects an angular velocity around the Y-axis, a Z gyro 13G which detects an angular velocity around the Z-axis, an X accelerometer 11A which detects acceleration in the X-axis direction, a Y accelerometer 12A which detects acceleration in the Y-axis direction, a Z accelerometer 13A which detects acceleration in the Z-axis direction, a GPS antenna 14A, a GPS receiver 14 connected to the GPS antenna 14A, a magnetic azimuth sensor 15, and a data calculation section 16 configured by a control section including a CPU, ROM and RAM. The sensor 10 can be connected with a display section 18. The X gyro 11G, Y gyro 12G and Z gyro 13G are fixed to the azimuth/attitude detecting sensor 10 in such a way that their respective detection directions are perpendicular to one another. Likewise, the X accelerometer 11A, Y accelerometer 12A and Z accelerometer 13A are fixed to the azimuth/attitude detecting sensor 10 in such a way that their respective detection directions are perpendicular to one another and their corresponding gyro detection directions match one another.

Angular velocity signals from the X gyro 11G, Y gyro 12G and Z gyro 13G, acceleration signals from the X accelerometer 11A, Y accelerometer 12A and Z accelerometer 13A and a magnetic azimuth signal from the magnetic azimuth sensor 15 are sent to the data calculation section 16 and a gyro velocity signal and gyro direction signal from the GPS receiver 14 are also sent to the data calculation section 16 at predetermined intervals.

The data calculation section 16 receives the above described signals to calculate an attitude angle and azimuth and for that purpose and it is provided with a coordinate transformation matrix updating section 20, a coordinate transformation section 22, a calculation section for level error compensatory value 24, a calculation section for azimuth error compensatory value 26 and an attitude/azimuth calculation section 28, all of which are constructed by software.

Figure 2:
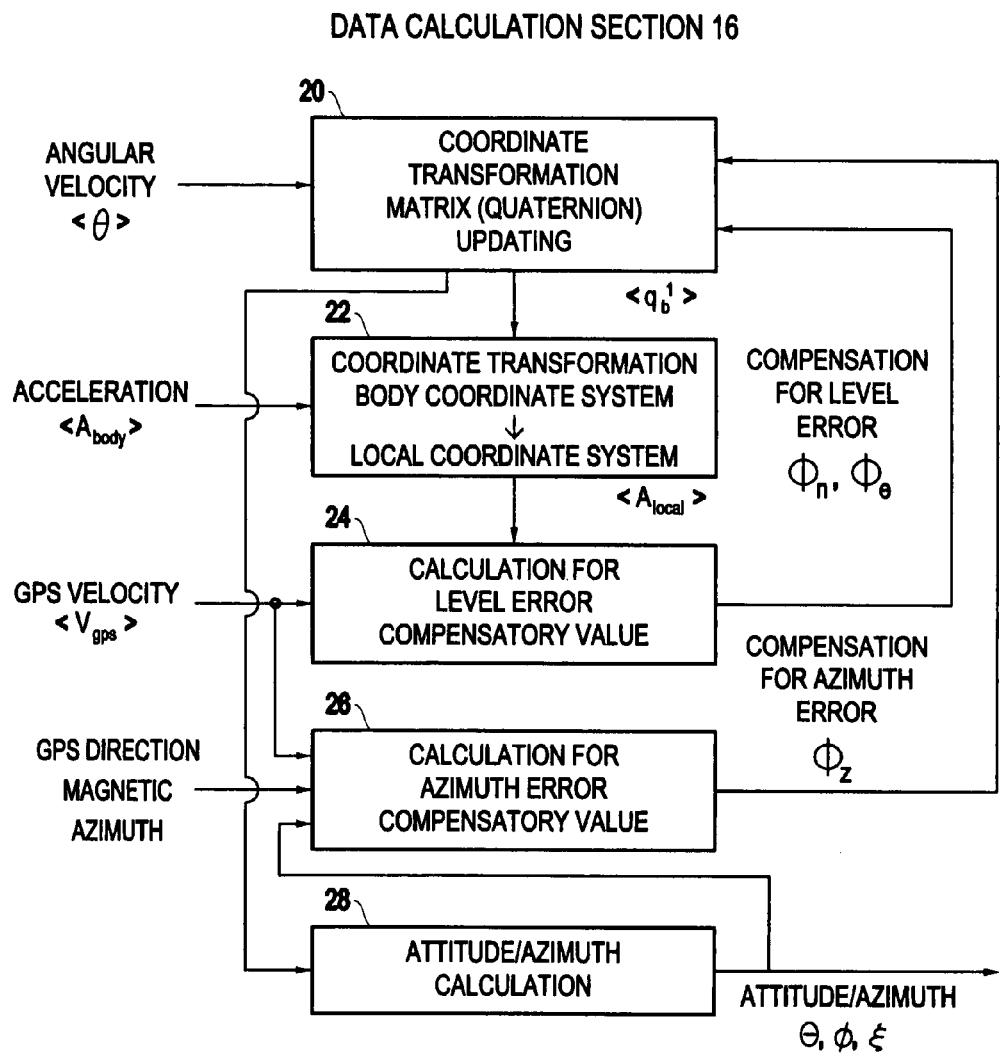
FIG. 2 is a block diagram showing processes by a data calculation section of the azimuth/attitude detecting sensor in FIG. 1.

As shown in FIG. 2, the coordinate transformation matrix updating section 20 is intended to successively calculate and update coordinate transformation matrices from the body coordinate system to which the gyros 11G to 13G and accelerometers 11A to 13A are attached, into the local coordinate system using gyro signals, the coordinate transformation section 22 is intended to perform a coordinate transformation of acceleration signals using the coordinate transformation matrix, the calculation section for level error compensatory value 24 is intended to calculate level error compensatory values using the coordinate-transformed acceleration signals, the calculation section for azimuth error compensatory value 26 is intended to calculate azimuth error compensatory values using GPS direction signal and a magnetic azimuth signal, the coordinate transformation matrix updating section 20 corrects the coordinate transformation matrix using the level error compensatory values and the azimuth error compensatory values and the attitude/azimuth calculation section 28 outputs a rolling angle, pitch angle and azimuth from the compensated coordinate transformation matrix.

Hereinafter, processes carried out by the respective sections will be explained in detail using equations.

I. Updating Coordinate Transformation Matrix

Updating of a coordinate transformation matrix carried out by the coordinate transformation matrix updating section 20 is momentarily to calculate the relationship between the body coordinate system and the local coordinate system. An arbitrary method can be used as the specific method of calculation therefor and this embodiment uses quaternions whose summary will be shown below.

Quaternion $<q>$ is expressed by the following equations. It consists of scalar component $\lambda$ and vector component $<\rho>$. Hereinafter, vectors will be expressed enclosed by $<\ >$.

$$<q> = \lambda + \rho_x <i> + \rho_y <j> + \rho_z <k> \quad (1)$$

$$= \lambda + <\rho>$$

where $<i>$, $<j>$, $<k>$ are unit quaternions and have the following characteristic.

$$<i>^2 = <j>^2 = <k>^2 = <i><j><k> = -1$$

$$<i><j> = -<j><i> = <k>$$

$$<j><k> = -<k><j> = <i>$$

$$<k><i> = -<i><k> = <j> \quad (2)$$

From these characteristics, the product of quaternions $q_1$ and $q_2$ can be expressed by the following equation.

$$<q_1><q_2> = \lambda_1 \lambda_2 - <\rho_1> \cdot <\rho_2> + \lambda_1 <\rho_2> + \lambda_2 <\rho_1> + <\rho_1> \times <\rho_2>$$

"·" in the equation denotes a scalar product of vectors, "×" denotes a vector product of vectors. An addition of quaternions and subtraction between quaternions are the same as those of normal vector calculations and correspond to calculations of an addition of the respective components and subtraction between the respective components.

Conjugate quaternion $<q>'$ is expressed by the following equation.

$$<q>' = \lambda - <\rho> \quad (4)$$

Furthermore, from Equation 3 and Equation 4, it is derived that the conjugate of the product of quaternions can be expressed by the following equation.

$$(<q_1><q_2>)' = <q_2>'<q_1>' \quad (5)$$

Assuming a vector obtained by performing a rotating coordinate transformation of vector $<V_b>$ of a b coordinate system into an a coordinate system to be $<V_a>$, the calculation equation when using quaternions for the coordinate transformation is as follows.

$$<V_a> = <q><V_b><q>' \quad (6)$$

From the nature of this Equation 6, a combination of rotations can be expressed by the product of quaternions shown by Equation 3.

When Equation 6 is expanded with components and $<V_a> = C<V_b>$ is set by using coordinate transformation matrix C and elements of the coordinate transformation matrix C is assumed to be:

$$C = \begin{bmatrix} C11 & C21 & C31 \\ C12 & C22 & C32 \\ C13 & C23 & C33 \end{bmatrix} \quad (7)$$

the respective elements can be expressed as follows:

$$C11 = \lambda^2 + \rho_x^2 - \rho_y^2 - \rho_z^2 \quad (8)$$

$$C12 = 2(\rho_x \cdot \rho_y + \lambda \cdot \rho_z) \quad (9)$$

$$C13 = 2(\rho_x \cdot \rho_z - \lambda \cdot \rho_y) \quad (10)$$

$$C21 = 2(\rho_x \cdot \rho_y - \lambda \cdot \rho_z) \quad (11)$$

$$C22 = \lambda^2 - \rho_x^2 + \rho_y^2 - \rho_z^2 \quad (12)$$

$$C23 = 2(\rho_y \cdot \rho_z + \lambda \cdot \rho_x) \quad (13)$$

$$C31 = 2(\rho_x \cdot \rho_z + \lambda \cdot \rho_y) \quad (14)$$

$$C32 = 2(\rho_y \cdot \rho_z - \lambda \cdot \rho_x) \quad (15)$$

$$C33 = \lambda^2 - \rho_x^2 - \rho_y^2 + \rho_z^2 \quad (16)$$

The azimuth/attitude angle is defined as an angle of rotation of the body coordinate system with respect to the local coordinate system. Now, the angle of rotation is defined in the following order from a state in which the body coordinate system matches the local coordinate system.

First, rotate around the Z-axis by an azimuth $\xi$.

Next, rotate around the Y-axis by an pitch angle $\theta$.

Finally, rotate around the X-axis by a rolling angle $\phi$.

At this time, the respective elements of a coordinate transformation matrix from the body coordinate system to the local coordinate system can be expressed as follows:

$$C11 = \cos\xi \cdot \cos\theta \quad (17)$$

$$C12 = \sin\xi \cdot \cos\theta \quad (18)$$

$$C13 = -\sin\theta \quad (19)$$

$$C21 = -\sin\xi \cdot \cos\phi + \cos\xi \cdot \sin\theta \cdot \sin\phi \quad (20)$$

$$C22 = \cos\xi \cdot \cos\phi + \sin\xi \cdot \sin\theta \cdot \sin\phi \quad (21)$$

$$C23 = \cos\theta \cdot \sin\phi \quad (22)$$

$$C31 = \sin\xi \cdot \sin\phi + \cos\xi \cdot \sin\theta \cdot \cos\phi \quad (23)$$

$$C32 = -\cos\xi \cdot \sin\phi + \sin\xi \cdot \sin\theta \cdot \cos\phi \quad (24)$$

$$C33 = \cos\theta \cdot \cos\phi \quad (25)$$

When an azimuth/attitude angle is calculated from quaternions, it is appreciated from Equation (8) to Equation (25) that the following equations can be used:

$$\xi = \tan^{-1}(C12/C11) = \tan^{-1}\{2(\rho_x \cdot \rho_y + \lambda \cdot \rho_z)/(\lambda^2 + \rho_x^2 - \rho_y^2 - \rho_z^2)\} \quad (26)$$

$$\theta = -\sin^{-1}(C13) = -\sin^{-1}\{2(\rho_x \cdot \rho_z - \lambda \cdot \rho_y)\} \quad (27)$$

$$\phi = \tan^{-1}(C23/C33) = \tan^{-1}\{2(\rho_y \cdot \rho_z + \lambda \cdot \rho_x)/(\lambda^2 - \rho_x^2 - \rho_y^2 + \rho_z^2)\} \quad (28)$$

When the quaternions whose summary has been explained above are used, assuming that a vector obtained by performing a coordinate transformation of a vector $<V_{body}>$ in the body coordinate system into a local coordinate system is $<V_{local}>$ and a quaternion representing a rotating coordinate transformation from the body coordinate system to the local coordinate system is $<q_b^l>$, the relationship between $<V_{body}>$ and $<V_{local}>$ can be expressed from Equation 6 by the following equation:

$$<V_{local}> = <q_b^l><V_{body}><q_b^l>' \quad (29)$$

The coordinate transformation matrix is updated by updating quaternion $<q_b^l>$ with a combination of rotations by the quaternion product. This updating is performed at measuring intervals ($\Delta t$) of the gyro output.

$$<q_b^l(t)> = <q_1^l(t)><q_b^{1'}(t-\Delta t)><q_b^{b'}(t)> \quad (30)$$

Here, $<q_b^{1'}(t-\Delta t)>$ refers to the quaternion representing a rotating coordinate transformation from the body coordinate system into the local coordinate system calculated at the previous measurement. (i) $<q_b^{b'}(t)>$ represents an update of the body coordinate system, and is updated by a variation angle (calculated from the angular velocity) of the sampling interval detected by the gyro. (ii) $<q_1^l(t)>$ represents an update of the local coordinate system, and is updated by compensation calculations (explained in chapter III., IV. later) of a leveling error and azimuth error.

In the update in (i), angular velocities detected by a gyro normally correspond to three axial directions X, Y, Z.

However, for the angle used for each axis (angular velocity), a value already corrected with respect to sensor errors (bias error, scale factor error, etc.) is used.

In the update in (ii), also rotations obtained by compensation calculations correspond to 3 axial directions (north, east, vertical). When the compensatory angles of north, east, vertical directions are assumed to be $\Phi_n(t)$, $\Phi_e(t)$, $\Phi_z(t)$, respectively, they are actually expressed using a first-order expanded approximation as shown in the following equation.

$$<q_1^l(t)> = 1 + \Phi_n(t)/2<i> + \Phi_e(t)/2<j> + \Phi_z(t)/2<k> \quad (31)$$

The calculations of $\Phi_n(t)$, $\Phi_e(t)$, $\Phi_z(t)$ will be described later.

II. Coordinate Transformation

A coordinate transformation performed by the coordinate transformation section 22 is to perform a coordinate transformation of an arbitrary vector from the body coordinate system into the local coordinate system using the quaternion calculated by the coordinate transformation matrix updating section 20 in chapter I. according to Equation 29. That is, body coordinate system acceleration vector $<A_{body}>$ (X acceleration, Y acceleration, Z acceleration) detected by the accelerometers 11A, 12A, 13A in the body coordinate system are coordinate-transformed into a local coordinate system acceleration vector $<A_{local}>$ (east/west acceleration, north/south acceleration, vertical acceleration) according to the following equation.

$$<A_{local}> = <q_b^l><A_{body}><q_b^l>' \quad (32)$$

III. Compensation for Level Error

The calculation section for level error compensatory value 24 calculates $\Phi_n(t)$, $\Phi_e(t)$ (compensatory angles in the north and east directions of the local coordinate system) in Equation 31 so that the gravity acceleration components of the east/west acceleration and north/south acceleration out of the local coordinate system acceleration obtained by the coordinate transformation section 22 in II. converge to 0, that is, so that the local coordinate system becomes horizontal.

Figure 3:
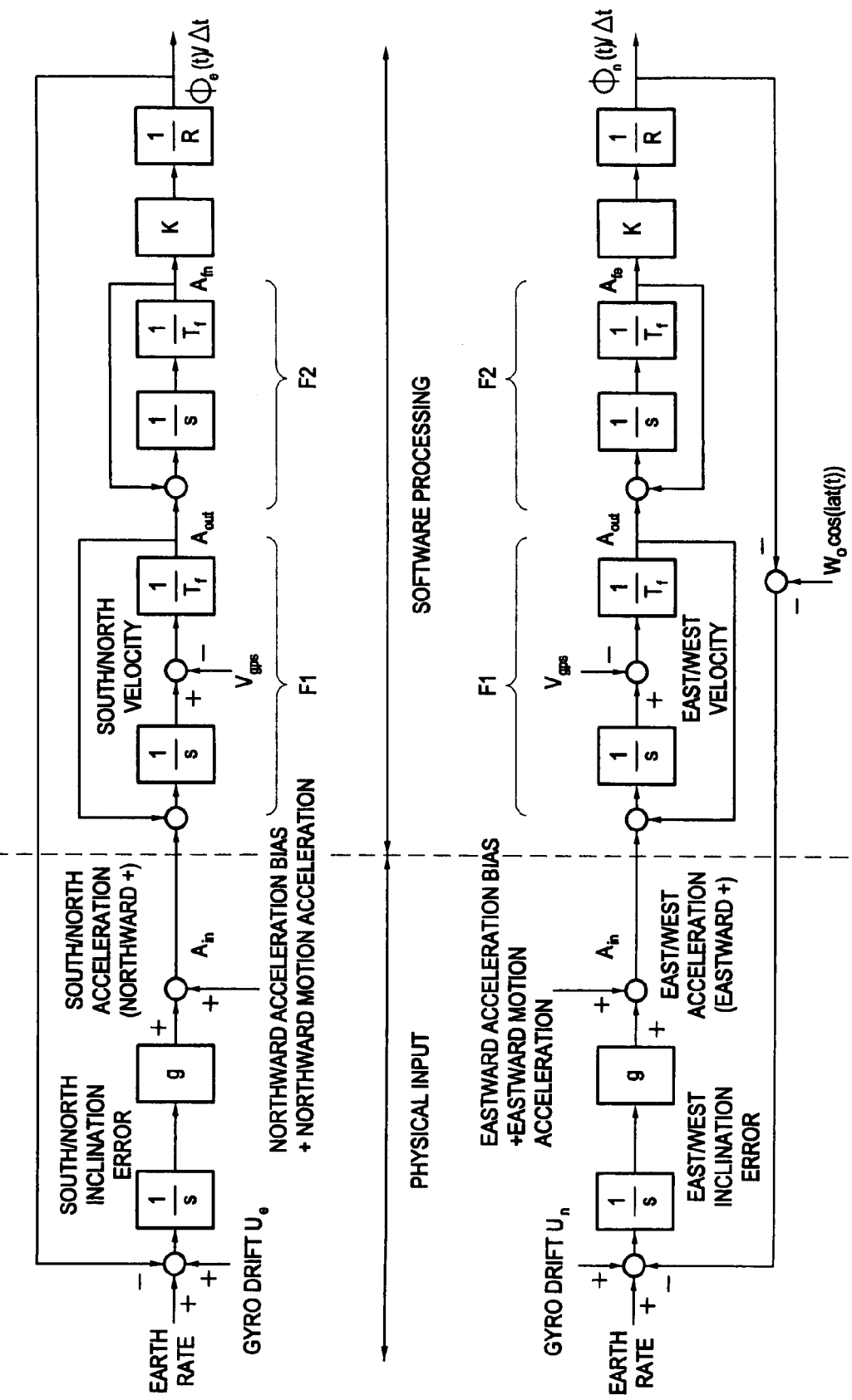
FIG. 3 is a block diagram showing processes by a calculation section for level error compensatory value.

More specifically, the calculation by the calculation section for level error compensatory value 24 is carried out as follows; removing motion acceleration from the east/west acceleration, north/south acceleration calculated by the coordinate transformation section 22 in II. With using the GPS velocity acquired from the GPS receiver 14 as a reference velocity and multiplying the filtered resulting value by a feedback gain constant, and obtaining a level error compensatory value. In this regard, the east, west, north and south of the local system at this time is controlled so as to match the east, west, north and south of the reference (GPS) velocity through the azimuth error compensation in the calculation section for azimuth error compensatory value 26 explained in chapter IV below. As shown in FIG. 3, a calculation is performed so as to construct the first stage filter F1 and the second stage filter F2.

The actual calculation equation is shown below.

Suppose the local acceleration (north/south, east/west) input to the first stage filter F1 at time t is $<A_{in}(t)>$, reference (GPS) velocity is $<V_{gps}(t)>$, quaternion updating interval is $\Delta t$, filter time constant is $T_f$, then the local acceleration (north/south, east/west)$<A_{out}(t)>$ output from the first stage filter F1 is expressed as follows.

$$<A_{out}(t)> = \left\{ \begin{array}{c} \sum_{n=1}^{t}(<A_{in}(n)> - <A_{out}(n-1)>) \\ \Delta t - <V_{gps}(t)> \end{array} \right\} / T_f \qquad (33)$$

$$<A_{out}(0)> = 0$$

In this way, by eliminating the influences of motion acceleration using the GPS velocity as a reference velocity, it is possible to construct the apparatus simply and at low cost.

The calculation performed in the second stage filter F2 is the same as Equation 33 except the term of the reference velocity removed. The second stage filter does not have any content essential to this control calculation and is therefore omissible, but it is intended to reduce the influences of accelerometer noise, that is, delay the response of the accelerometer to a high frequency input. However, the characteristic of the feedback system (response, stability condition, etc.) is affected by this second stage filter F2.

Suppose the output of the second stage filter F2 to which $<A_{out}(t)>$ is input is $<A_f(t)>$ (each element is $A_{fn}(t)$: component in north/south direction, $A_{fe}(t)$: component in east/west direction). This $<A_f(t)>$ includes the component of gravity acceleration due to an inclination error (error caused by the local system not being horizontal) and residual of motion acceleration compensation at the first stage filter F1. $\Phi_n(t)$: compensatory angle around the north axis of the local coordinate system, $\Phi_e(t)$: compensatory angle around the east axis of the local coordinate system in Equation 31 are calculated using the following equations so that the $<A_f(t)>$ converges to 0:

$$\Phi_n(t) = (-A_{fe}(t) \cdot K/R - W0 \cdot \cos(\text{lat}(t))) \Delta t \qquad (34)$$

$$\Phi_e(t) = (A_{fn}(t) \cdot K/R) \Delta t \qquad (35)$$

Note that $W0 \cdot \cos(\text{lat}(t))$ in the above equation is a compensation term for angular velocity input due to the Earth rate (Earth's rotation) and W0 is the angular velocity of the Earth's rotation and lat(t) is latitude. However, the compensation term of the angular velocity input due to the Earth rate is small compared to a gyro error, and therefore it is omissible.

IV. Compensation for Azimuth Error

Figure 4:
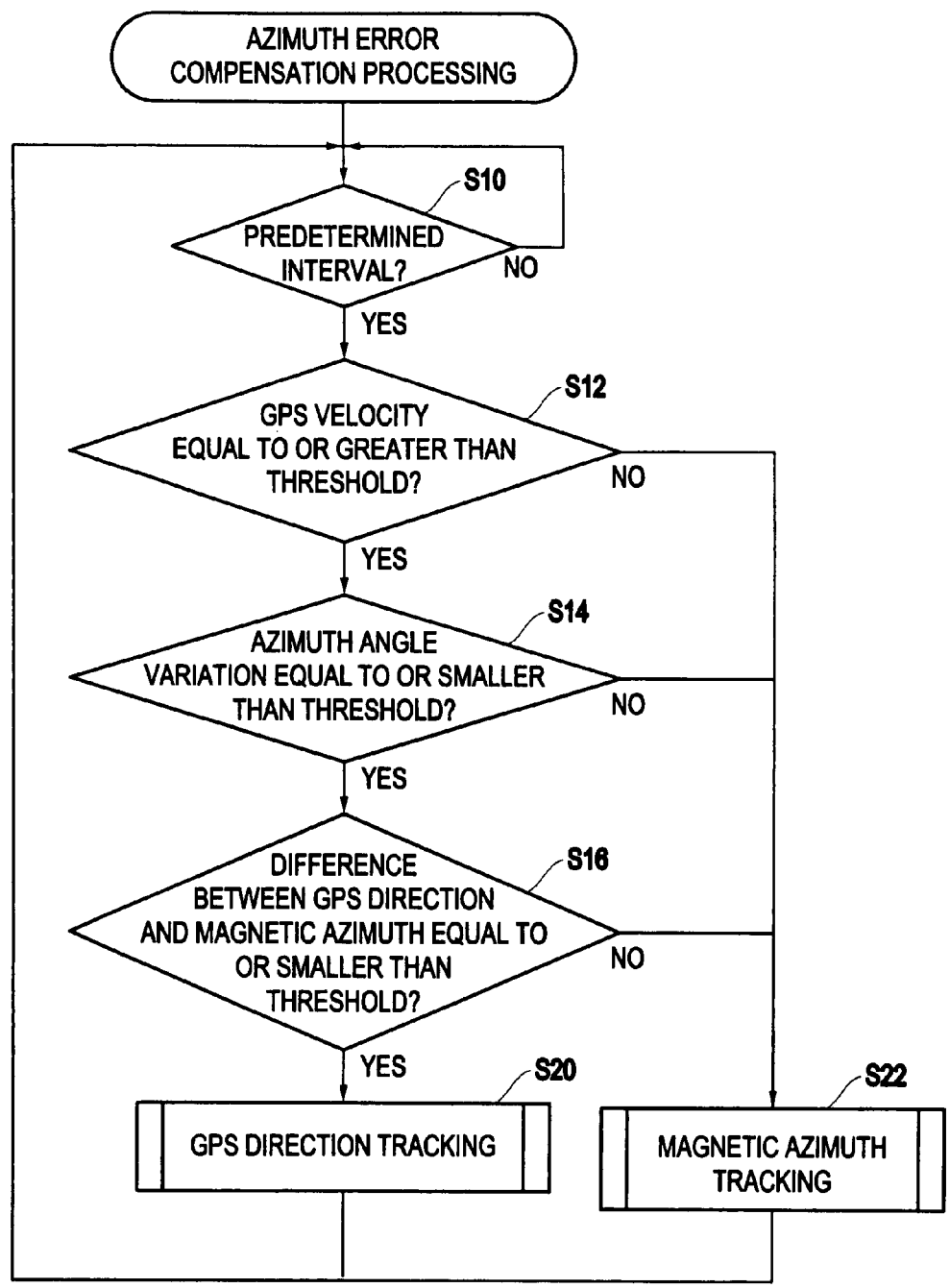
FIG. 4 is a flow chart showing processes by a calculation section for azimuth error compensatory value.
Figure 5A:
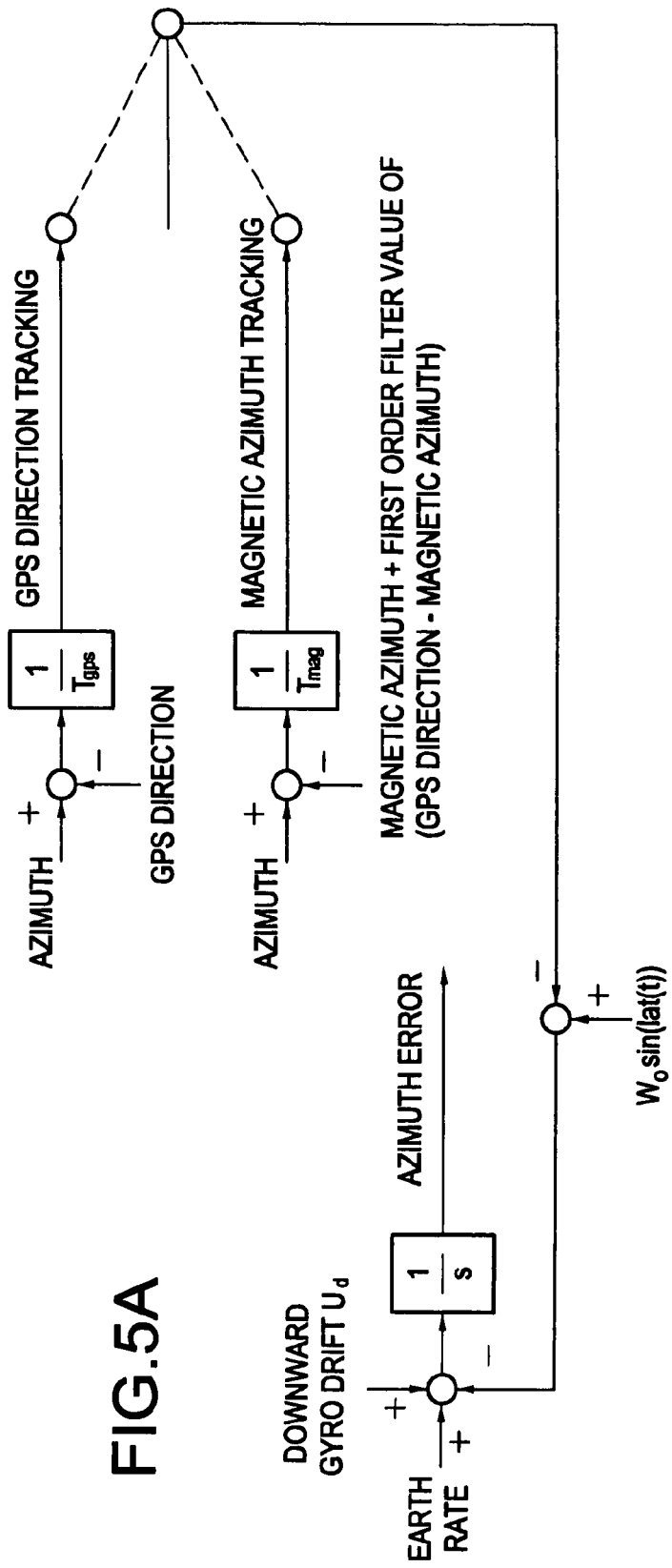
FIGS. 5A–5B are a block diagram showing processes by the calculation section for azimuth error compensatory value.
Figure 5B:
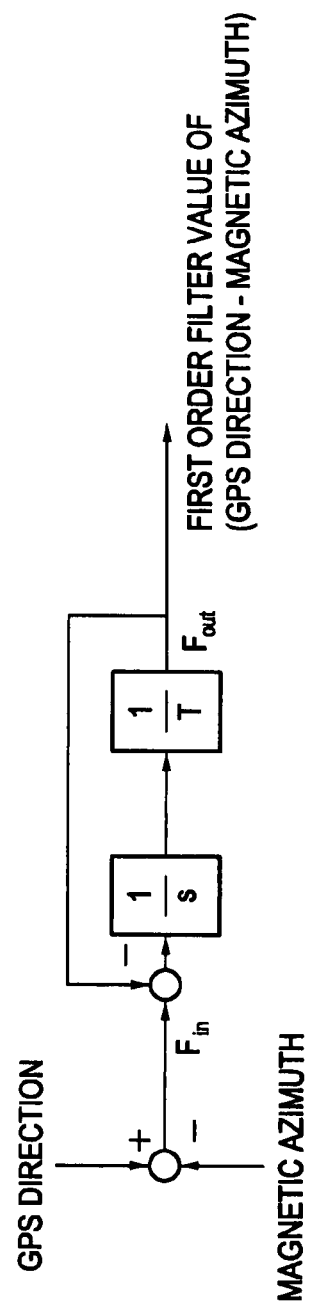

Next, compensation of the azimuth error by the calculation section for azimuth error compensatory value 26 is performed by switching between two states; (i) a state in which the GPS direction (direction: motion direction) from the GPS receiver 14 is tracked and (ii) a state in which the magnetic azimuth from the magnetic azimuth sensor 15 (reference (north) is adjusted so as to match the GPS direction reference) is tracked. FIG. 4 shows a flow chart indicating these state transitions. (i) State in which GPS direction is tracked When the GPS velocity obtained from the GPS receiver 14 is equal to or greater than a threshold (step S12). the azimuth variation is equal to or smaller than a threshold (step S14) and the difference between the GPS direction and magnetic azimuth is equal to or smaller than a threshold (step S16), the reliability of the GPS direction is deemed to be high and a process of tracking the GPS direction is carried out (step S20). This is because when these conditions are satisfied, the GPS direction is assumed to match a certain axis of the azimuth/attitude detecting sensor 10. Alternatively, when any condition other than these conditions (S12, S14, S16) or any one of these conditions is satisfied, the process may be adapted so as to move to step S20.

More specifically, assuming that (azimuth−GPS direction) is an azimuth error, $\Phi_z(t)$ (compensatory angle in the vertical direction of the local coordinate system) is calculated according to Equation 31 so that this azimuth error converges to 0.

$$\Phi_z(t) = -(\text{azimuth}-\text{GPS direction})\Delta t/T_{gps} \qquad (36)$$

where $T_{gps}$ is a time constant of convergence, $\Delta t$ is a quaternion updating interval.

Furthermore, in preparation for the next state of tracking the magnetic azimuth sensor 15, a first order filter value in the (GPS direction−magnetic azimuth) is calculated.

The calculation equation is the same as Equation 33 except the term of the reference velocity removed and assuming that the filter input value $F_{in}(n)$=GPS direction (n)−magnetic azimuth (n) and the filter output value is $F_{out}(n)$, the calculation equation is expressed as follows:

$$F_{out}(t) = \left\{ \sum_{n=1}^{t}(F_{in}(n) - F_{out}(n-1))\Delta t \right\} / T \qquad (37)$$

$$F_{out}(0) = 0$$

where T is a time constant of filter.

(ii) State in Which Magnetic Azimuth is Tracked

In the flow chart of FIG. 4, when the OPS velocity obtained from the GPS receiver 14 is smaller than the threshold, the azimuth variation is greater than the threshold or the difference between the GPS direction and magnetic azimuth is equal to or greater than a threshold, the reliability of the magnetic azimuth is deemed to be higher than the reliability of the GPS direction and a process of tracking the magnetic azimuth is carried out (step S22). However, instead of completely tracking the magnetic azimuth at this time, the first order filter value of the (GPS direction−magnetic azimuth) calculated during the process of tracking the GPS direction is used. That is, (azimuth−(magnetic azimuth+first order filter value of (GPS direction−magnetic azimuth))) is assumed to be the azimuth error and $\Phi_z(t)$ (compensatory angle in the vertical direction of the local coordinate system) in Equation 31 is calculated so that this azimuth error converges to 0.

$$\Phi_z(t) = -(\text{azimuth}-(\text{magnetic azimuth}+\text{first order filter} \\ \text{value of (GPS direction}-\text{magnetic azimuth})))\Delta t/ \\ T_{mag} \qquad (38)$$

where $T_{mag}$ is a time constant of convergence and $\Delta t$ is a quaternion updating interval.

The filter value of the (GPS direction−magnetic azimuth) immediately after the startup is initialized with a magnetic variation in the GPS data or a calculated value during the previous operation stored in a non-volatile memory. After a state of tracking the GPS direction in (i) is set even once, the latest value calculated in (i) is used.

Thus, instead of tracking only the magnetic azimuth from the magnetic azimuth sensor, by adding the latest value of the difference between the GPS azimuth and magnetic azimuth calculated when tracking the GPS direction to the magnetic azimuth, it is possible to reduce errors in the magnetic azimuth which may be included due to influences of the surrounding magnetic field or influences of a variation in the magnetic variation which is a difference between the magnetic azimuth and true azimuth depending on the place where the apparatus is used or lapse of time. Furthermore, it is also possible to prevent the reference azimuth to be tracked from changing a great deal when tracking of the GPS direction in (i) and tracking of the magnetic azimuth in (ii) are switched and thereby provide the system with stability.

V. Calculation for Attitude/Azimuth

The attitude/azimuth calculation section 28 calculates the attitude angle (roll, pitch) and azimuth through quaternions using Equations 26, 27, 28 and displays/outputs the calculation results on the display section 18 at updating intervals.

Through the above described processes, it is possible to output the rolling angle, pitch angle and azimuth from the coordinate transformation matrix with level errors and azimuth errors compensated.

While the principles of the invention have been described above in connection with specific embodiments, and particular modifications thereof, it is to be clearly understood that this description is made only by way of example and not as a limitation on the scope of invention.

What is claimed is:

1. An azimuth/attitude detecting sensor mounted on a mobile unit for detecting an azimuth/attitude of the mobile unit, comprising:

at least three gyros that detect angular velocities around three axes and output angular velocity signals;

at least three accelerometers that detect accelerations in three axial directions and output acceleration signals;

GPS receiver that detects a moving direction of the mobile unit using GPS and outputs a GPS direction signal;

a magnetic azimuth sensor that detects the magnetic azimuth and outputs a magnetic azimuth signal; and calculation unit for receiving the angular velocity signals output from the gyros, the acceleration signals output from the accelerometers, the GPS direction signal output from the GPS receiver, the magnetic azimuth signal output from the magnetic azimuth sensor and calculating a rolling angle, pitch angle and azimuth, wherein said calculation unit comprises:

a coordinate transformation matrix updating section that successively calculates and updates a coordinate transformation matrix from a body coordinate system to which the gyros and accelerometers are attached, into a local coordinate system using said angular velocity signals;

a coordinate transformation section that performs a coordinate transformation of said acceleration signals using the coordinate transformation matrix from said coordinate transformation matrix updating section;

a calculation section for level error compensatory value that calculates a level error compensatory value using the acceleration signals transformed by the coordinate transformation section;

a calculation section for azimuth error compensatory value that calculates an azimuth error compensatory value using the GPS direction signal and magnetic azimuth signal;

an attitude/azimuth calculation section that calculates a rolling angle, pitch angle and azimuth from said coordinate transformation matrix compensated by the level error compensatory value and azimuth error compensatory value, and said calculation section for azimuth error compensatory value which, when a reliability of the GPS direction signal is high, calculates the azimuth error compensatory value using the GPS direction signal and, calculates a difference between the GPS direction signal and the magnetic azimuth signal and which, when the reliability of the GPS direction signal is not high and when a reliability of the magnetic azimuth signal is high, calculates the azimuth error compensatory value by using the magnetic azimuth signal and using said difference between the GPS direction signal and the magnetic azimuth signal calculated when the reliability of the GPS direction signal is high.

2. The azimuth/attitude detecting sensor according to claim 1, wherein the condition wherein the reliability of said GPS direction signal is high includes at least one of conditions tat the velocity of the mobile unit is equal to or higher than a predetermined value, that the calculated azimuth variation is equal to or lower than a second predetermined value and that a difference between the GPS direction signal and magnetic azimuth signal is equal to or lower than a third predetermined value.

3. The azimuth/attitude detecting sensor according to claim 1, wherein said calculation section for azimuth error compensatory value regards a value indicating a difference between the azimuth and GPS direction as the azimuth error compensatory value under a condition wherein The reliability of the GPS direction signal is high.

4. The azimuth/attitude detecting sensor according to claim 1, wherein said calculation section for azimuth error compensatory value regards a value indicating a difference between the azimuth and a value obtained by subtracting a value based on said difference between the GPS direction signal and magnetic azimuth signal from the magnetic azimuth as an azimuth error compensatory value under a condition wherein the reliability of the GPS direction signal is not high and under a condition wherein the reliability of the magnetic azimuth signal is high.

5. The azimuth/attitude detecting sensor according to claim 1, wherein said calculation section for level error compensatory value removes a motion acceleration from the accelerations of the acceleration signals using a GPS velocity signal output from the GPS receiver and calculates the level error compensatory value.

* * * * *